United States Patent Office 3,433,580
Patented Mar. 18, 1969

3,433,580
OZONE SCAVENGER
Rudolf Deuringer, El Toro, Calif., assignor to Beckman Instruments, Inc., a corporation of California
No Drawing. Filed Apr. 6, 1965, Ser. No. 446,123
U.S. Cl. 23—2        7 Claims
Int. Cl. C01b *13/00*

---

ABSTRACT OF THE DISCLOSURE

The specification discloses an azone scavenger and a method for producing the scavenger. The scavenger comprises a silver body which has been treated by coating the body with silver sulfide and then heating the body in an oxygen containing atmosphere to oxidize the silver sulfide coating so as to produce a dull white surface thereon. The scavenger removes azone from a gas stream but does not affect $SO_2$ therein.

---

This invention relates generally to an ozone scavenger and, more particularly, to a material that destroys ozone but does not retain $SO_2$ from the atmosphere.

Two of the most prominent irritants in the atmosphere are ozone and $SO_2$. Because of the increased levels of these irritants found in the atmosphere in some areas, it has become necessary to monitor the atmosphere to determine when the irritants reach a dangerously high level. If the $SO_2$ measuring equipment used in the monitoring of the atmosphere is based upon the reducing properties of this gas, then errors in the measurement of the $SO_2$ can result if the atmosphere is also polluted with ozone. An example of an $SO_2$ measuring instrument based upon the reducing properties of $SO_2$ is described in copending patent application entitled "Gas Analysis" by Paul A. Hersch and Rudolf Deuringer, Ser. No. 433,554 filed Feb. 18, 1965, assigned to the assignee of the present application.

It is well-known that atmospheric ozone may be destroyed, that is, converted to diatomic oxygen, by passing it over certain metal catalysts. Silver is generally known as catalyzing this reaction of ozone. However, in removing all ozone from a gas by using a metal such as silver, it is necessary to heat the metal to substantially high temperatures. For example, it is necessary to heat silver to about 100° C. to destroy all the ozone at a level of 4 volumes per million in a stream of air passing at 100 milliliters per minute through a column of this catalyst 5 cm. long and 0.5 cm. in diameter. When it is desired to provide $SO_2$ measuring equipment which is portable and therefore independent of any power source, it is obviously disadvantageous to use a silver screen that has to be heated to 100° C. as an azone scavenger for the instrument.

It is, therefore, the principal object of the present invention to provide an ozone scavenger which does not retain $SO_2$ and is operable at room temperature and, therefore, does not require an independent source of power to function as desired.

Another object of the invention is to provide a material which readily destroys ozone at the levels generally encountered in the atmosphere yet does not affect $SO_2$, thus permitting $SO_2$ to be analyzed by a measuring instrument which is based upon the reducing properties of this gas.

According to the principal aspect of the present invention, a silver body is treated in such a manner that the silver destroys ozone but does not affect $SO_2$ at the levels that these irritants are normally found in the atmosphere. This treatment involves first the formation of a coating of silver sulfide on the silver and, thereafter, the heating of the sliver in an oxygen containing atmosphere for sufficient time and at a sufficient temperature, preferably about 600° C. or higher, to substantially oxidize the silver sulfide coating on the silver, thus leaving a body of silver having a dull white color. It has been unexpectedly found that when a stream of gas containing both ozone and $SO_2$ is passed over a body of silver treated in the above manner, the ozone is destroyed but the $SO_2$ is not retained in the silver, thus permitting measurements of $SO_2$ by instruments which are based on the reducing species of this gas.

Other objects, aspects and advantages of the invention will become more apparent from the following description.

In a search for a material which would act as an ozone scavenger, yet not retain $SO_2$, air containing traces of ozone was passed over coarsely granulated silver at room temperature with the result that the silver destroyed all the ozone. However, the silver also affected the $SO_2$ level of the gas inasmuch as it retained as much as 5 volumes per million of $SO_2$ in an air stream moving at 100 milliliters per minute. Even after the silver granules were conditioned by exposing them to a stream of air containing sulfur dioxide, the tendency of the granules to retain $SO_2$ remained.

In an additional effort to make a suitable ozone scavenger which was not influenced by $SO_2$, silver granules were heated in the presence of powdered sulfur in an air stream to produce a black layer of silver sulfide. This material still retained a substantial amount of $SO_2$ from a gas stream. However, I discovered that if the silver granules coated with silver sulfide were heated sufficiently in an oxygen containing atmosphere, so that the black color of the silver changed to a dull white resulting from the oxidation of the silver sulfide, the silver destroyed, at room temperature, all ozone in a gas stream, without retaining any trace of $SO_2$ at the levels at which ozone and $SO_2$ may be found in polluted air.

By way of example, but not by limitation, an ozone scavenger was produced in accordance with the invention by supporting in a Vycor tube a column of silver granules of a size which would pass through a 50 mesh screen. Powedered sulfur, generally referred to as sulfur flower, was dusted into the tube and mixed with the silver granules. Thereafter, the tube was heated in a flame to about 400 to 500° C. until the silver granules became coated with a black layer, which evidenced the conversion of the surface of the granules to silver sulfide. Then the tube was heated in the flame to about 600° C. and air was passed through the tube by blowing into the end of the tube to provide an oxygen containing atmosphere therein. The heating at 600° C. with the air passing through the tube was continued for about 5 minutes until the silver granules obtained a dull white surface, resulting from the oxidation of the silver sulfide.

In order to test the characteristics of the silver granules treated as described above, a gas stream containing 1.5 volumes per million of ozone and .2 volume per million of sulfur dioxide was passed through the tube at 100 milliliters per minute and delivered to a sulfur dioxide measuring instrument as described in the aforementioned copending patent application. The 1.5 volumes per million of ozone is an extremely high level of ozone in comparison to that which is normally found in the atmosphere in those areas where ozone is generally considered to be relatively high. For example, in the Los Angeles area where air pollution is relatively high, a concentration of .5 volume per million of ozone in the atmosphere is considered serious. Also, $SO_2$ is generally found in levels well below 1 volume per million. The .2 volume per million of $SO_2$ in the sample gas stream are not untypical for polluted air. It was found that under the above conditions the measuring instrument showed the entire .2 volume per million of $SO_2$. Thus, the silver granules, treated in accordance with the invention, had not affected the sulfur dioxide content of the sample gas stream but had destroyed all the ozone in the stream.

In a second test, .15 volume per million of $SO_2$ in a gas stream containing a background of 1.5 volumes per million of ozone was passed through the oxygen scavenger of the invention and the sulfur dioxide measuring instrument with the ozone not affecting the output of the instrument. Thus, by the present invention there is provided an extremely efficient ozone scavenger, that is, a material that destroys ozone yet does not retain or otherwise influence sulfur dioxide in a gas sample.

Although the invention has been described specifically in connection with the use of silver granules, it is to be understood that the treatment of silver is applicable to any silver body which has a sufficiently large surface area to provide sufficient contact with a gas stream passing thereover to destroy ozone in the stream. The silver body could be in the form of a porous body and does not necessarily need to comprise silver granules. Furthermore, although the specific example above describes the sulfidizing of the silver granules as being accomplished by dusting sulfur flower over the granules and heating in a Vycor tube, it is to be understood that the silver granules or other porous body of silver may be sulfidized by any other convenient method, such as by positioning the silver over a body of solid sulfur and heating the sulfur to sublime it on the surface of the silver, or by treating it with a solution of sulfur in carbon disulfide.

Although several embodiments of the invention have been disclosed herein for purposes of illustration, it will be understood that various other applications of the invention are possible and changes in the materials and treatment in such embodiments may be made without departing from the spirit and scope of the invention as defined by the appended claims.

What is claimed is:

1. A method of producing an ozone scavenger which does not retain $SO_2$ comprising the steps of:
    forming a coating of silver sulfide on a body of silver; and
    heating said body to about 600° C. or higher in an oxygen containing atmosphere to substantially oxidize said silver sulfide coating and produce a dull white surface on said body.

2. A method of producing an ozone scavenger which does not retain $SO_2$ comprising the steps of:
    forming a coating of silver sulfide on a plurality of silver granules; and
    heating said granules to about 600° C. or higher in an oxygen containing atmosphere to substantially oxidize said silver sulfide coating on said granules and produce a dull white surface on said granules.

3. A method of producing an ozone scavenger which does not retain $SO_2$ comprising the steps of:
    applying powdered sulfur to a plurality of silver granules;
    heating said granules to about 400° to 500° C. to form a black coating of silver sulfide on said granules; and
    heating said granules to about 600° C. or higher in an oxygen containing atmosphere to substantially oxidize said sulfide coating on said granules whereby said granules obtain a dull white surface.

4. An ozone scavenger which does not retain $SO_2$ comprising a body of silver having a large surface area treated by forming a black coating of silver sulfide on said body and, thereafter, heating said body to about 600° C. or higher in an oxygen containing atmosphere to substantially oxidize said silver sulfide coating and produce a dull white surface on said body.

5. A method of removing ozone from a sample gas stream including ozone and $SO_2$ without retaining $SO_2$ comprising the step of:
    passing a sample gas stream including ozone and $SO_2$ over a silver body having a large surface area; said silver body having been prepared by forming a coating of silver sulfide on a silver body and, thereafter, heating said silver sulfide coated body to about 600° C. or higher in an oxygen containing atmosphere to substantially oxidize said silver sulfide coating.

6. A method as claimed in claim 5 wherein said body is porous.

7. A method as claimed in claim 5 wherein said body comprises a plurality of granules.

References Cited

UNITED STATES PATENTS

| 2,091,259 | 8/1937 | Fisher | 23—134 |
| 1,565,595 | 12/1925 | Shelling | 23—138 |
| 1,947,776 | 2/1934 | Huff et al. | 23—2.1 |
| 2,747,968 | 5/1956 | Pigache | 23—2.1 |

FOREIGN PATENTS 440,255 10/1948 Italy.

OTHER REFERENCES

Comprehensive Treatise on Inorganic and Theoretical Chemistry, vol. 3, J. W. Mellor D. Sc., Longmans Green & Co., N.Y. (1923), pp. 438 and 442, QD–31–M4, Copy in Gr. 110.

PATRICK P. GARVIN, *Primary Examiner.*

PAUL E. KONOPKA, *Assistant Examiner.*

U.S. Cl. X.R.

23—232, 178; 252—476, 472